United States Patent [19]
Chen

[11] Patent Number: 5,544,905
[45] Date of Patent: Aug. 13, 1996

[54] DEVICE FOR MAKING MICROADJUSTMENT OF BEARING OF BICYCLE HEAD BOWL

[75] Inventor: Sheng-Luen Chen, Taichung, Taiwan

[73] Assignee: Dia-Compe, Taiwan Co., Ltd., Taichung, Taiwan

[21] Appl. No.: 415,358

[22] Filed: Mar. 30, 1995

[51] Int. Cl.[6] .................................................. B62K 21/18
[52] U.S. Cl. ......................... 280/279; 74/551.1; 384/538; 384/540; 384/545; 403/24; 403/320; 403/373
[58] Field of Search ............................ 280/279; 384/538, 384/540, 545; 403/24, 90, 104, 315, 320, 362, 373; 74/551.1

[56] References Cited

U.S. PATENT DOCUMENTS

| | | | |
|---|---|---|---|
| 1,409,748 | 3/1922 | Meiselbach | 280/279 |
| 3,260,535 | 7/1966 | Jaulmes | 280/279 |
| 5,303,611 | 4/1994 | Chi | 280/279 |
| 5,454,281 | 10/1995 | Chi | 280/279 |

*Primary Examiner*—Mitchell J. Hill
*Attorney, Agent, or Firm*—Pro-Techtor International

[57] ABSTRACT

An adjusting device assembly for making, a manual adjustment of a bicycle head bowl bearing comprises a front fork upright tube inserted into a head tube in which a bearing bowl is received. A bearing is received in the bearing bowl and can be located securely by an inner ring, which can be forced to move downwards by a locating ring which is in turn caused to move downwards by a clamping ring capable of being caused to move downwards by an adjustment bolt which can be fastened manually.

1 Claim, 3 Drawing Sheets

DEVICE FOR MAKING MICROADJUSTMENT OF BEARING OF BICYCLE HEAD BOWL

FIELD OF THE INVENTION

The present invention relates generally to a bicycle, and more particularly to a device for making a microadjustment of the bicycle head bowl bearing.

BACKGROUND OF THE INVENTION

According to the prior art, the bicycle head bowl bearing is located by means of the front fork upright tube which is provided at the top thereof with threads engageable with a pressing element, which works to locate the bearing in conjunction with a fastening member. Such a fastening means of the prior art as described above has inherent shortcomings, which are expounded explicitly hereinafter.

The structural strength of the front fork upright tube is undermined by the threads which are located at the top of the front fork upright tube. As a result, the front fork upright tube is vulnerable to deformation or crack when the handlebar upright tube is inserted into the front fork upright tube.

It is rather inconvenient and time-consuming to fasten the bearing which has become loosened, in view of the fact that the work of fastening the loosened bearing calls for the use of a hand tool, such as a wrench.

It is difficult to make a microadjustment of the bearing by means of a hand tool.

SUMMARY OF THE INVENTION

It is therefore the primary objective of the present invention to provide a device for making a microadjustment of the bearing of the bicycle head bowl.

The foregoing objective of the present invention is attained by a clamping ring which is located under the fastening nut of the front fork upright tube and is provided with an inverted conical surface and a locating ring corresponding in shape to the conical surface. The locating ring is provided with a tapered protruded edge corresponding in location to a tapered hole of an inner ring of the bearing. When the clamping ring is tightened. The locating ring is forced to move downwards. The downward movement of the locating ring brings about a downward movement of the inner ring of the bearing so as to attain a microadjustment of the bearing.

DETAILED DESCRIPTION OF THE EMBODIMENT

Figure 1:
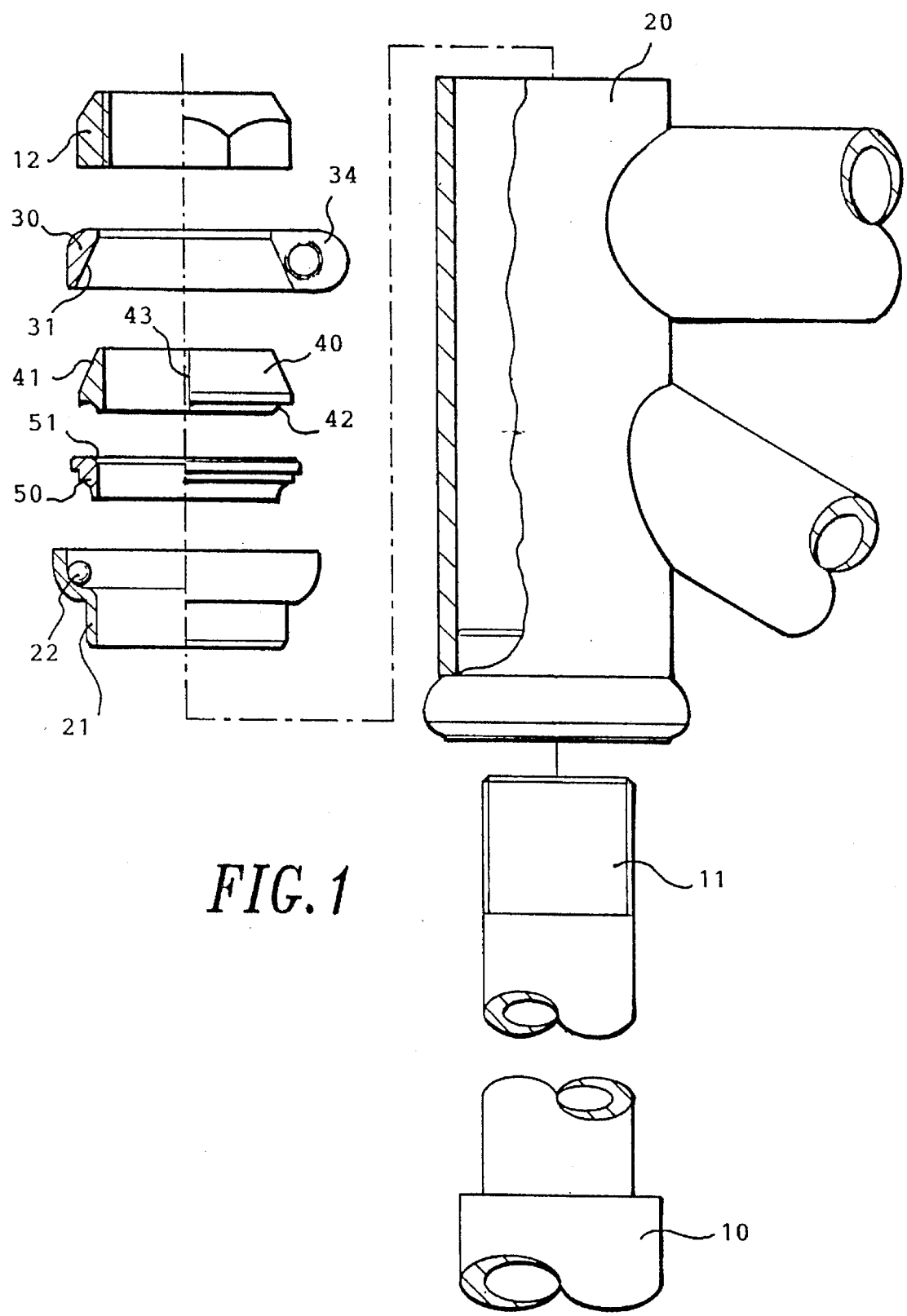
FIG. 1 shows an exploded view of the present invention.
Figure 2:
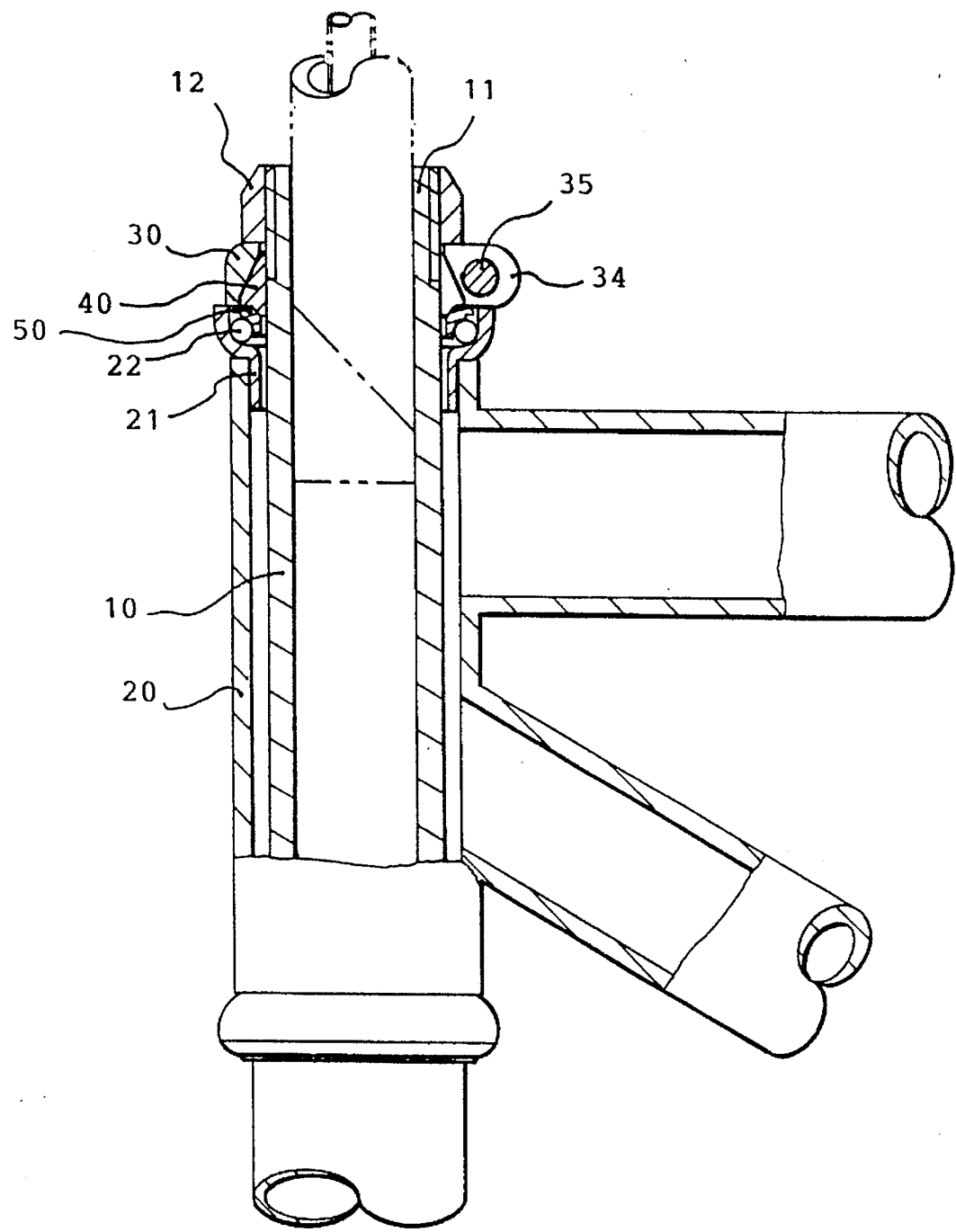
FIG. 2 shows a schematic view of the present invention in combination.
Figure 3:
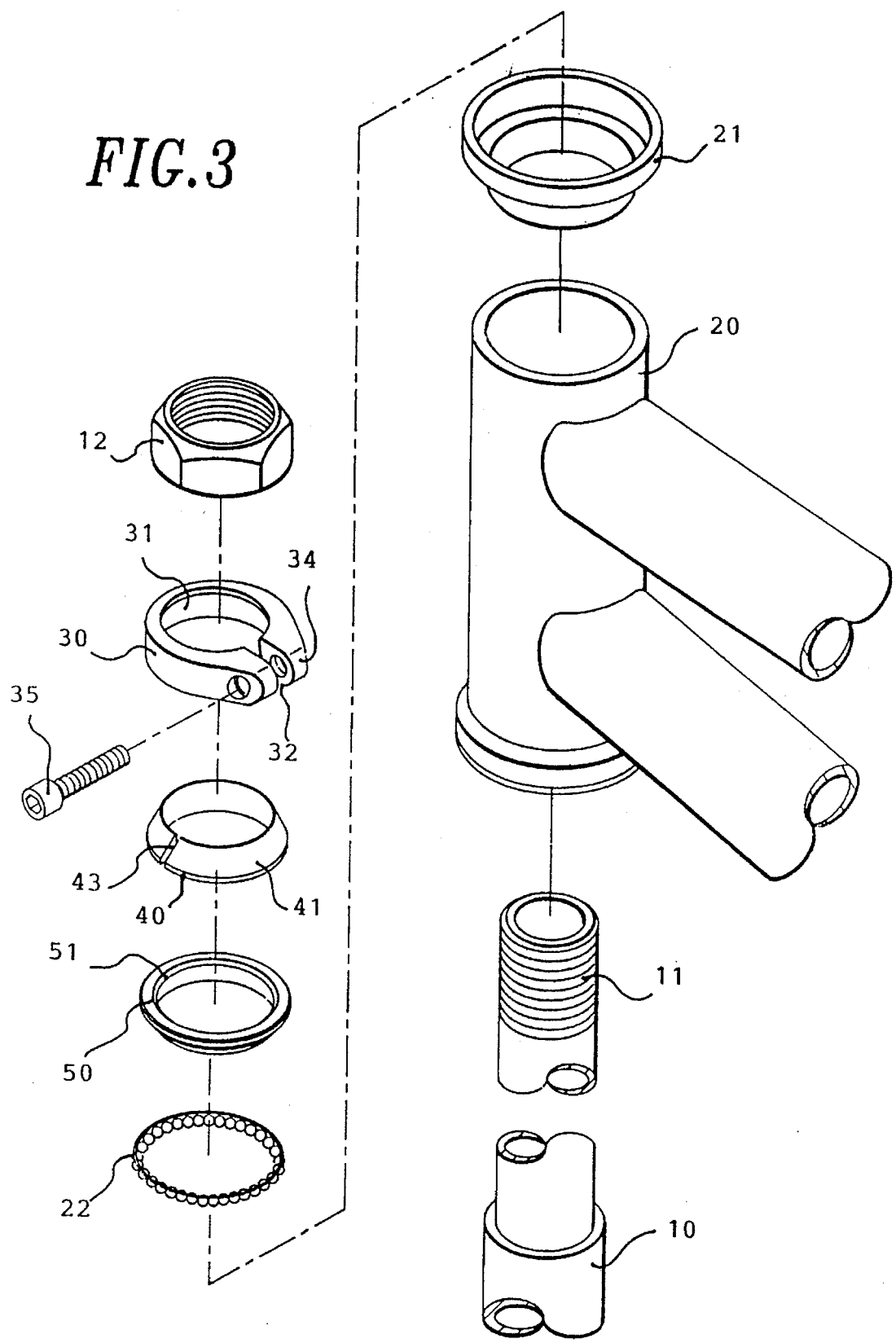
FIG. 3 shows another exploded view of the present invention.

As shown in FIGS. 1 to 3, the present invention comprises the component parts which are described explicitly hereinafter.

A front fork upright tube 10 is provided at the top end there of with threads 11 engageable with a fastening nut 12 and is inserted into a head tube 20. The head tube 20 has a top end engageable with a bearing bowl 21 in which a bearing 22 is received.

A clamping ring 30 is provided therein with an inverted conical surface 31, an opening 32, and two lugs 34 having respectively a threaded hole. The clamping ring 30 is fastened by means of an adjustment bolt 35 engageable with the threaded holes of the lugs 34.

A locating ring 40 is provided with a tapered circumferential edge 41 corresponding in shape to the inverted conical surface 31 of the clamping ring 30. The locating ring 40 is further provided with a tapered protruded edge 42 and an opening 43.

An inner ring 50 is provided with a tapered circumferential edge 51 corresponding in location to the tapered protruded edge 42 of the locating ring 40.

In combination, the front fork upright tube 10 is inserted into the head tube 20 in which the bearing bowl 21, the bearing 22, the inner ring 50, the locating ring 40, the clamping ring 30, and the fastening nut 12 are received. As the bolt 35 of the clamping ring 30 is fastened, the clamping ring 30 and the locating ring 40 are caused to move downwards at the same time. The downward movement of the locating ring 40 causes the inner ring 50 to move down so as to locate the bearing 22.

The present invention described above has inherent advantages, which are expounded hereinafter.

The microadjustment of the bearing 22 can be made easily without a hand tool by fastening the adjustment bolt 35 in a minute manner so as to cause the clamping ring 30 and the locating ring 40 to move downwards.

The threaded portion located at the top of the front fork upright tube can be so shortened that the structural strength of the front fork upright tube is enhanced substantially. As a result, the front fork upright tube is not vulnerable to deformation or crack when the handlebear upright tube is inserted into the front fork upright tube.

The present invention is relatively simple in construction and is therefore cost-effective.

The present invention is simple to use and can be well received by the bicyclist.

The embodiment of the present invention described above is to be regarded in all respects as merely illustrative and not restrictive. Accordingly, the present invention may be embodied in other specific forms without deviating from the spirit thereof.

The present invention is therefore to be limited only by the scope of the following appended claim.

What is claimed is:

1. An adjusting device assembly for making a microadjustment of a bicycle head bowl bearing comprising:

a front fork upright tube provided at a top end thereof with threads engageable with a fastening nut;

a head tube dimensioned to receive therein said front fork upright tube;

a clamping ring provided with an inverted conical surface, two lugs having respectively a threaded hole, and an adjustment bolt engageable with said threaded holes of said two lugs;

a locating ring provided with a tapered circumferential edge corresponding in shape to said inverted conical surface of said clamping ring, a tapered protruded edge, and an opening;

an inner ring provided with a tapered circumferential edge corresponding in location to said tapered protruded edge of said locating ring;

a bearing located under said inner ring; and a bearing bowl having a bottom dimensioned to fit into a top end of said head tube, said bearing bowl further having an upper portion in which said inner ring and said bearing are received;

wherein said adjustment bolt of said clamping ring can be fastened manually to cause said clamping ring and said locating ring to move downwards at the same time so as to force said inner ring to move downwards to locate securely said bearing.

* * * * *